(12) United States Patent
Rajan et al.

(10) Patent No.: US 8,521,574 B1
(45) Date of Patent: *Aug. 27, 2013

(54) PRIORITIZING CLIENT ACCOUNTS

(75) Inventors: Aruna Rajan, Bangalore (IN); Nithya Rajamani, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 5 days.

This patent is subject to a terminal disclaimer.

(21) Appl. No.: 13/527,702

(22) Filed: Jun. 20, 2012

Related U.S. Application Data

(63) Continuation of application No. 13/527,662, filed on Jun. 20, 2012.

(51) Int. Cl.
*G06Q 10/00* (2012.01)

(52) U.S. Cl.
USPC .......................................................... 705/7.11

(58) Field of Classification Search
USPC ............... 705/7.11, 7.29; 707/737, 748, 500; 709/224
See application file for complete search history.

(56) References Cited

U.S. PATENT DOCUMENTS

| | | | |
|---|---|---|---|
| 6,571,227 B1* | 5/2003 | Agrafiotis et al. .............. | 706/15 |
| 7,406,430 B2 | 7/2008 | Atefi et al. | |
| 7,673,040 B2 | 3/2010 | Gilbert et al. | |
| 7,792,869 B2* | 9/2010 | Buscema ..................... | 707/802 |
| 7,924,732 B2 | 4/2011 | Schimmelpfeng et al. | |
| 8,073,810 B2 | 12/2011 | Maes | |
| 2003/0037074 A1* | 2/2003 | Dwork et al. ................. | 707/500 |
| 2004/0193515 A1 | 9/2004 | Peterson et al. | |
| 2004/0243968 A1 | 12/2004 | Hecksel | |
| 2006/0224437 A1* | 10/2006 | Gupta et al. .................... | 705/10 |
| 2007/0136115 A1* | 6/2007 | Senturk Doganaksoy et al. ................................. | 705/7 |
| 2008/0208644 A1* | 8/2008 | Gray et al. ........................ | 705/7 |
| 2009/0018847 A1 | 1/2009 | Vanbeck et al. | |
| 2009/0193433 A1 | 7/2009 | Maes | |
| 2009/0276403 A1* | 11/2009 | Tamayo et al. .................. | 707/3 |
| 2010/0023360 A1 | 1/2010 | Nadhan | |
| 2010/0036699 A1 | 2/2010 | Merrifield, Jr. et al. | |
| 2011/0125895 A1* | 5/2011 | Anderson et al. ............. | 709/224 |
| 2012/0197893 A1* | 8/2012 | Aravamudan et al. ........ | 707/737 |

FOREIGN PATENT DOCUMENTS

WO 2004/034188 4/2004

OTHER PUBLICATIONS

Service Delivery Optimization: Increase Enterprise Efficiency and Effectiveness, Business White Paper, May 2009, 5 pages.
U.S. Appl. No. 13/527,662, filed Jun. 20, 2012, First Named Inventor: Aruna Rajan, Confirmation No. 1049.
Office Action (Mailed Date Oct. 11, 2012) for U.S. Appl. No. 13/527,662; filed Jun. 20, 2012; Confirmation No. 1049.

* cited by examiner

*Primary Examiner* — Jonathan G Sterrett
*Assistant Examiner* — Stephanie Delich
(74) *Attorney, Agent, or Firm* — Schmeiser, Olsen & Watts; John Pivnichny

(57) ABSTRACT

A system for prioritizing accounts is provided. The method includes receiving operational metrics and data values associated with the operational metrics. The data values are aggregated and noisy data is removed from the operational metrics. Statistical averages associated with a performance of accounts are calculated and each account is modeled as a collection of operational performance variables and key performance indicators A ranking list is generated and a minimum number of independent operational parameters necessary are calculated. Pair wise ranks $\{r\}$ of the accounts are calculated and values associated with a tolerance limit epsilon and selected.

14 Claims, 6 Drawing Sheets

PRIORITIZING CLIENT ACCOUNTS

This application is a continuation application claiming priority to Ser. No. 13/527,662, filed Jun. 20, 2012.

FIELD

The present invention relates to a method and associated system for identifying and prioritizing client accounts by taking into consideration operational performance together with customer satisfaction.

BACKGROUND

Monitoring data with respect to products and individuals typically comprises an inaccurate process with little flexibility. Product data analysis may include a complicated process that may be time consuming and require a large amount of resources. Accordingly, there exists a need in the art to overcome at least some of the deficiencies and limitations described herein.

SUMMARY

The present invention provides a computer program product, comprising a computer readable storage device storing a computer readable program code, said computer readable program code comprising an algorithm that when executed by a computer processor of a computing system implements a method, said method comprising: receiving, by the computer processor from a plurality of service centers servicing accounts, operational metrics and data values associated with the operational metrics; aggregating, by the computer processor, the data values; removing, by the computer processor, noisy data from the operational metrics; calculating, by the computer processor, statistical averages associated with a performance of the accounts during a specified time period; modeling, by the computer processor, each account of the accounts as a collection of operational performance variables and key performance indicators (KPI), wherein an account (i)={Op1 . . . OpN}, and wherein Op is an operational parameter space comprising Op1 . . . OpN; rating, by the computer processor, a ranking list (R) comprising a ranking of the accounts within the operational parameter space (Op) using a pair-wise similarity measure; calculating, by the computer processor, a minimum number of independent operational parameters necessary (D) for representing a group of accounts of the accounts in a reduced operational space {P} of dimension D; representing, by the computer processor, the accounts as points in the reduced operational space {P}; calculating, by the computer processor, pair wise ranks {r} of the group of accounts within the reduced operational space {P}; updating, by the computer processor, $x\_i \rightarrow x\_i + a*\backslash sum\_\{i,j\}(R\_ij-r\_ij)(x\_i-x\_j)/|x\_i-x\_j|$, wherein x_i comprises a position of account (i) within the reduced operational space {P}, and wherein (a) comprises a relaxation parameter; selecting, by the computer processor, a values associated with a tolerance limit epsilon; and determining, by the computer processor, if sum_{i,j}(R_ij−r_ij)^2 is less than the tolerance limit epsilon.

The present invention provides a computer system comprising a computer processor coupled to a computer-readable memory unit, said memory unit comprising instructions that when executed by the computer processor of a computing system implements a method comprising: receiving, by the computer processor from a plurality of service centers servicing accounts, operational metrics and data values associated with the operational metrics; aggregating, by the computer processor, the data values; removing, by the computer processor, noisy data from the operational metrics; calculating, by the computer processor, statistical averages associated with a performance of the accounts during a specified time period; modeling, by the computer processor, each account of the accounts as a collection of operational performance variables and key performance indicators (KPI), wherein an account (i)={Op1 . . . OpN}, and wherein Op is an operational parameter space comprising Op1 . . . OpN; generating, by the computer processor, a ranking list (R) comprising a ranking of the accounts within the operational parameter space (Op) using a pair-wise similarity measure; calculating, by the computer processor, a minimum number of independent operational parameters necessary (D) for representing a group of accounts of the accounts in a reduced operational space {P} of dimension D; representing, by the computer processor, the accounts as points in the reduced operational space {P}; calculating, by the computer processor, pair wise ranks {r} of the group of accounts within the reduced operational space {P}; updating, by the computer processor, $x\_i \rightarrow x\_i + a*\backslash sum\_\{i,j\}(R\_ij-r\_ij)(x\_i-x\_j)/|x\_i-x\_j|$, wherein x_i comprises a position of account (i) within the reduced operational space {P}, and wherein (a) comprises a relaxation parameter; selecting, by the computer processor, a values associated with a tolerance limit epsilon; and determining, by the computer processor, if sum_{i,j}(R_ij−r_ij)^2 is less than the tolerance limit epsilon.

The present invention advantageously provides a simple method and associated system capable of monitoring data with respect to products and individuals.

DETAILED DESCRIPTION

Figure 1:
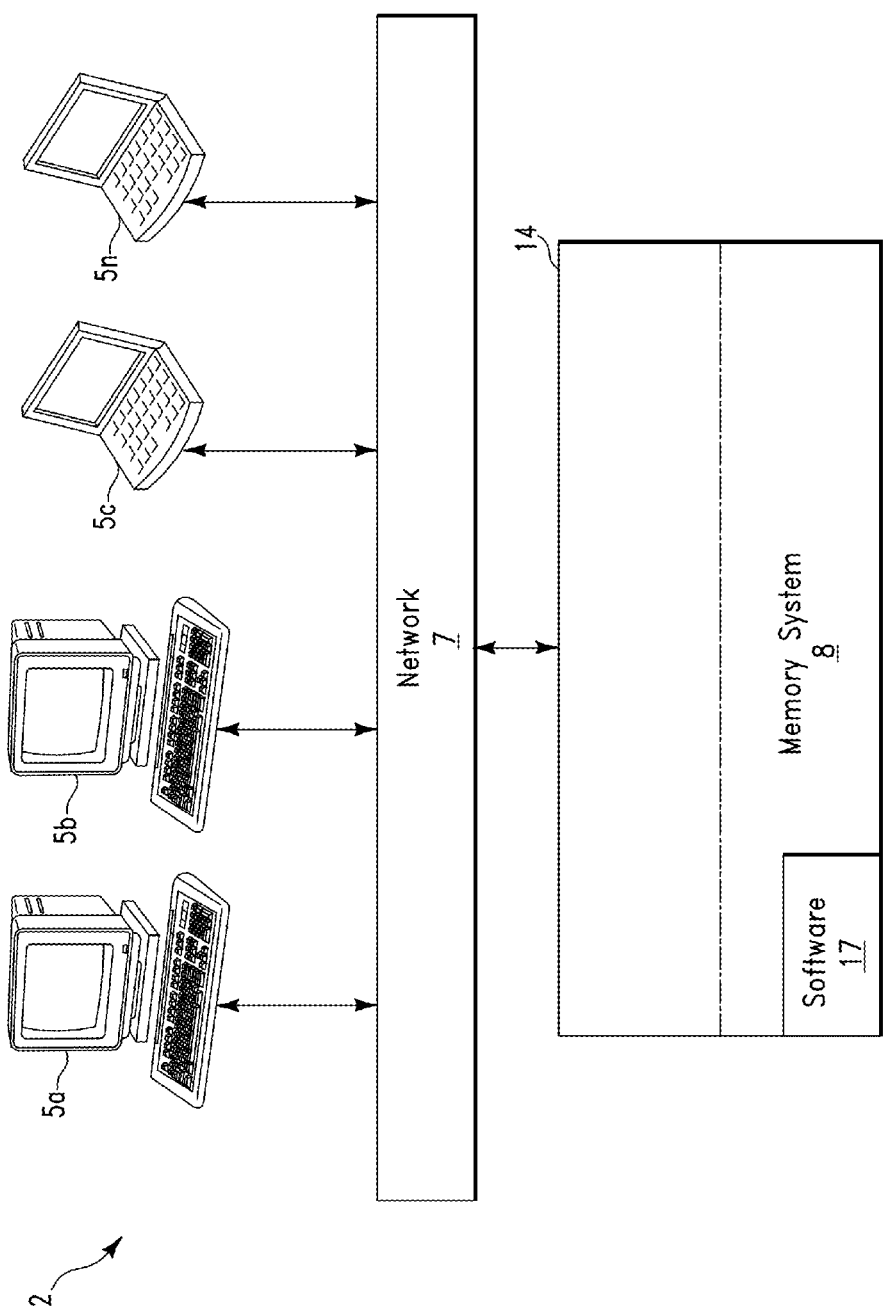
FIG. 1 illustrates a system for managing a portfolio of accounts, in accordance with embodiments of the present invention.

FIG. 1 illustrates a system 2 for managing a portfolio of accounts, in accordance with embodiments of the present invention. System 2 relates changes in operational parameters to an agility of an account with respect to meeting business needs of a client. System 2 detects patterns in operational behavior affecting client perception and map accounts to a set of points in a reduced multi dimensional space over a specified period of time. System 2 provides the following functionality for managing a portfolio of accounts:

1. Tracking of operational metrics that are relevant to accounts (e.g., monthly).
2. Mapping each account (of multiple accounts) in a multidimensional input space to a point in a reduced operational space to reduce an operational complexity. 3. Associating each point in the reduced operational space with a specified color based on a status.
4. Generating trajectory (for a contiguous set of points for a specific account) in a multidimensional space. The trajectory represents how an account is moved around in an operational space (due to varying demand) and an ability to handle the demand.
5. Each account receives a cumulative score (at a regular time interval) from a client in one or more dimensions.
6. Locating trajectories or axes (in a reduced dimensional space) along a set of similarly represented accounts.

System 2 of FIG. 1 comprises computers $5a$...$5n$ connected through a network 7 to a computing system 14. Network 7 may comprise any type of network including, inter alia, a local area network, (LAN), a wide area network (WAN), the Internet, a wireless network, etc. Computers $5a$...$5n$ may comprise any type of computers including, inter alia, a computer (PC), a laptop computer, a tablet computer, a server, a PDA, a smart phone, etc. Computing system 14 may comprise any type of computing system(s) including, inter alia, a computer (PC), a laptop computer, a tablet computer, a server etc. Computing system 14 comprises a memory system 8. Memory system 8 may comprise a single memory system. Alternatively, memory system 8 may comprise a plurality of memory systems. Memory system 8 comprises software 17.

System 2 correlates operational parameters with customer satisfaction measures and locates areas and accounts requiring urgent attention for operational improvement. Additionally, system 2 maps each account into a set of points in a reduced multi-dimensional space over a period of time. For example, if a set of operational parameters $\{Op\}$ are measured (e.g., monthly) across all delivery centers servicing an account, it may be determined that (for all accounts taken together) most of the operational parameters $\{Op\}$ are interrelated. Therefore, it may be determined that there is a smaller set of parameters $\{Cs\}$ that correspond to parameters of interest to a customer. System 2 enables a nonlinear, dimension reduction method to reduce the operational parameters $\{Op\}$ to a smaller set of independent parameters $\{P\}$. Additionally, customer satisfaction parameters are reduced to a small set of most significant parameters $\{C\}$. Accounts are selected by size, contract value, geography, sector, etc and trajectories (over a time period in a reduced operational parameters space $\{P\}$) are plotted. Points in the reduced operational parameters space $\{P\}$ may be assigned colors associated with corresponding values of the most significant parameters $\{C\}$. For example, an overall account status is selected from the most significant parameters $\{C\}$ and accounts are assigned the colors green, amber, and red corresponding to good (or normal), potential problem, and problematic accounts. A trajectory for each type of account (red/amber/green) may be followed and accounts that are close (in the reduced operational parameters space $\{P\}$) to red or amber accounts may be flagged for further action. The aforementioned process may be performed iteratively for every parameter of the most significant parameters $\{C\}$ thereby enabling a process for mapping trajectories in the reduced operational parameters space $\{P\}$ to patterns of the most significant parameters $\{C\}$.

System 2 enables a process for managing a portfolio of accounts as follows:

1. Values are collected (from operational metrics from different delivery centers servicing an account) and aggregated values.
2. Noisy data is filtered from the collected operational metrics and meaningful statistical averages of account performance in each operational dimension are calculated over a time period.
3. Each service delivery account is modeled as a collection of operational performance variables and key performance indicators selected (over e.g., a year) such that an Account_X=$\{Op1, \ldots OpN\}$ where $Opi$ is an ith operational parameter.
4. All accounts in an operational space $\{Op\}$ are ranked using a pair wise similarity measure (e.g., a root mean square euclidean distance). $\{R\}$ comprises a pair wise ranking of data points in an original space.
5. A minimum number of independent operational parameters needed (D) are calculated in order to represent all accounts in a reduced operational space $\{P\}$ of a dimension D.
6. All account are represented (and distributed uniformly) as points in a reduced operational parameters space $\{P\}$.
7. Pair wise ranks $\{r\}$ of all accounts in the reduced operational parameters space $\{P\}$ are calculated.
8. $x\_i \to x\_i + a^* \sum_{i,j}(R\_ij - r\_ij)(x\_i - x\_j)/|x\_i - x\_j|$ is updated (Let $x\_i$ comprise a position of account i in reduced operational parameters space $\{P\}$ and let $x\_j$ comprise a position of account j in reduced operational parameters space $\{P\}$ for pair wise ranking of the accounts) and appropriate values for the relaxation parameter a and a tolerance limit epsilon are selected.
9. It is determined if a $\sum_{i,j}(R\_ij - r\_ij)^2$ is less than a tolerance limit epsilon. If it is determined that the $\sum_{i,j}(R\_ij - r\_ij)^2$ is less than a tolerance limit epsilon then new updated coordinates of accounts in the reduced operational parameters space $\{P\}$ is presented to a user. 11. If it is determined that the $\sum_{i,j}(R\_ij - r\_ij)^2$ is greater than a tolerance limit epsilon then steps 7-9 are repeated.
10. After all final coordinates for all accounts in the reduced operational parameters space $\{P\}$ are obtained, a trajectory (e.g., over a year) is plotted for each account in an associated reduced operational parameter space $\{P\}$.
11. Statistically meaningful aggregates for overall account health of each account every month are calculated using annual customer surveys and account manager ratings for overall customer satisfaction corresponding to an account.
12. An overall health of the accounts is classified into multiple (e.g., three buckets). For example, red may indicate a very bad health, amber may indicate a potentially bad health, and green may indicate a good health.
13. Each point in the trajectory (generated in step 10) may be assigned a color (e.g., red/amber/green) corresponding to a customer satisfaction aggregate computed for that month.
14. Each data point may be assigned a color associated with a corresponding overall customer satisfaction rating/rating for additional customer survey parameters for the time period.
15. A trajectory of points of a same color may be mathematically mined using nonlinear curve fitting for locating a trajectory in an operational parameter space corresponding to a particular customer satisfaction rating of good, potentially bad, or very bad.
16. A mathematical equation in a reduced operational space $\{P\}$ (for accounts that illustrate business agility) is located. For example, while operational parameters illustrate a reasonable fluctuation (one standard deviation from a mean), a customer satisfaction remains high. The mathematical equation represents a mathematical trajectory for an agile account.

17. Steps 11-16 are repeated for additional parameters associated with customer surveys. For example, the additional parameters may include, inter alia, responsiveness, support, value provided, etc.

18. Visualization tools combined with interactive analysis tools allow users to simultaneously visualize and query portions of:

A. Operational performance trajectories to any time resolution (e.g., daily, weekly, monthly, etc).

B. Operational performance trajectories corresponding to a specific type of customer satisfaction rating.

C. Customer satisfaction ratings (good/bad/very bad) and allow for binning finer or coarser.

D. Operational performance trajectories are mined for scores corresponding to financial health, business health, etc by benchmarking against appropriate project management reports in place of customer surveys.

Figure 2:
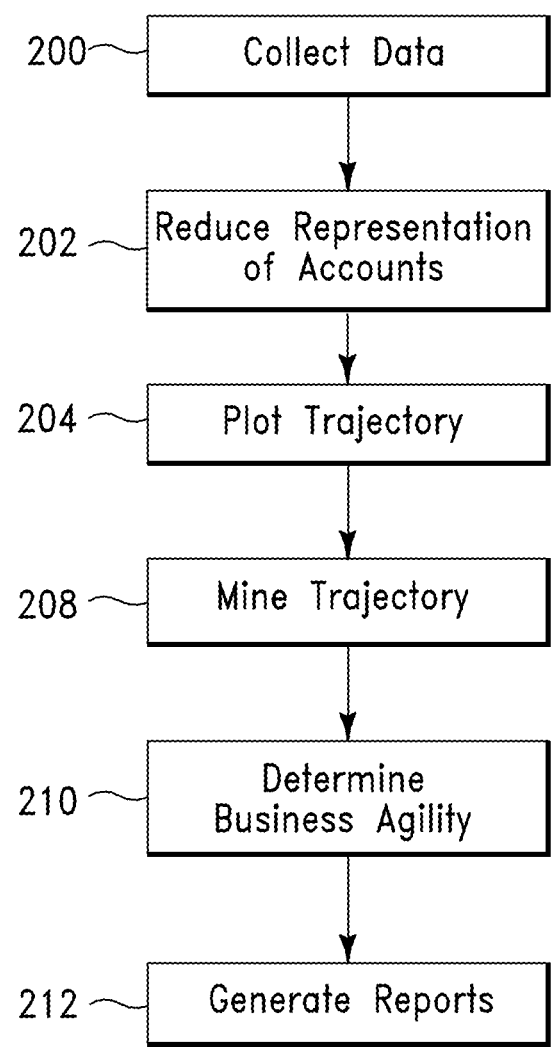
FIG. 2 illustrates an algorithm detailing a process flow enabled by the system of FIG. 1 for managing a portfolio of accounts, in accordance with embodiments of the present invention.

FIG. 2 illustrates an algorithm detailing a process flow enabled by system 2 of FIG. 1 for managing a portfolio of accounts, in accordance with embodiments of the present invention. In step 200, historical/current data (over a specified time period) comprising operational parameters for key performance indicators (KPIs) is collected for each (service delivery) account. In step 202, a representation of each account is reduced in an operational parameter space as described in detail with respect to the algorithm of FIG. 3. In step 204, a trajectory (over a specified time period) for each account in an associated reduced operational parameter space is plotted. Each data point (for each trajectory) is assigned a specified color corresponding to an overall customer satisfaction rating (or additional customer survey parameter ratings) for the specified time period. In step 208, each trajectory comprising data points of a same color is mined mathematically to locate a trajectory in an operational parameter space that corresponds to a specific customer satisfaction rating. In step 210, accounts illustrating business agility are selected. The accounts are selected based on operational parameters showing reasonable fluctuation while customer satisfaction remains high thereby illustrating that an associated account responds well to changing operational performance in accordance with changing customer scenarios. In step 212, overlapping customer survey and operational data is visualized and analyzed and associated reports are generated.

Figure 3:
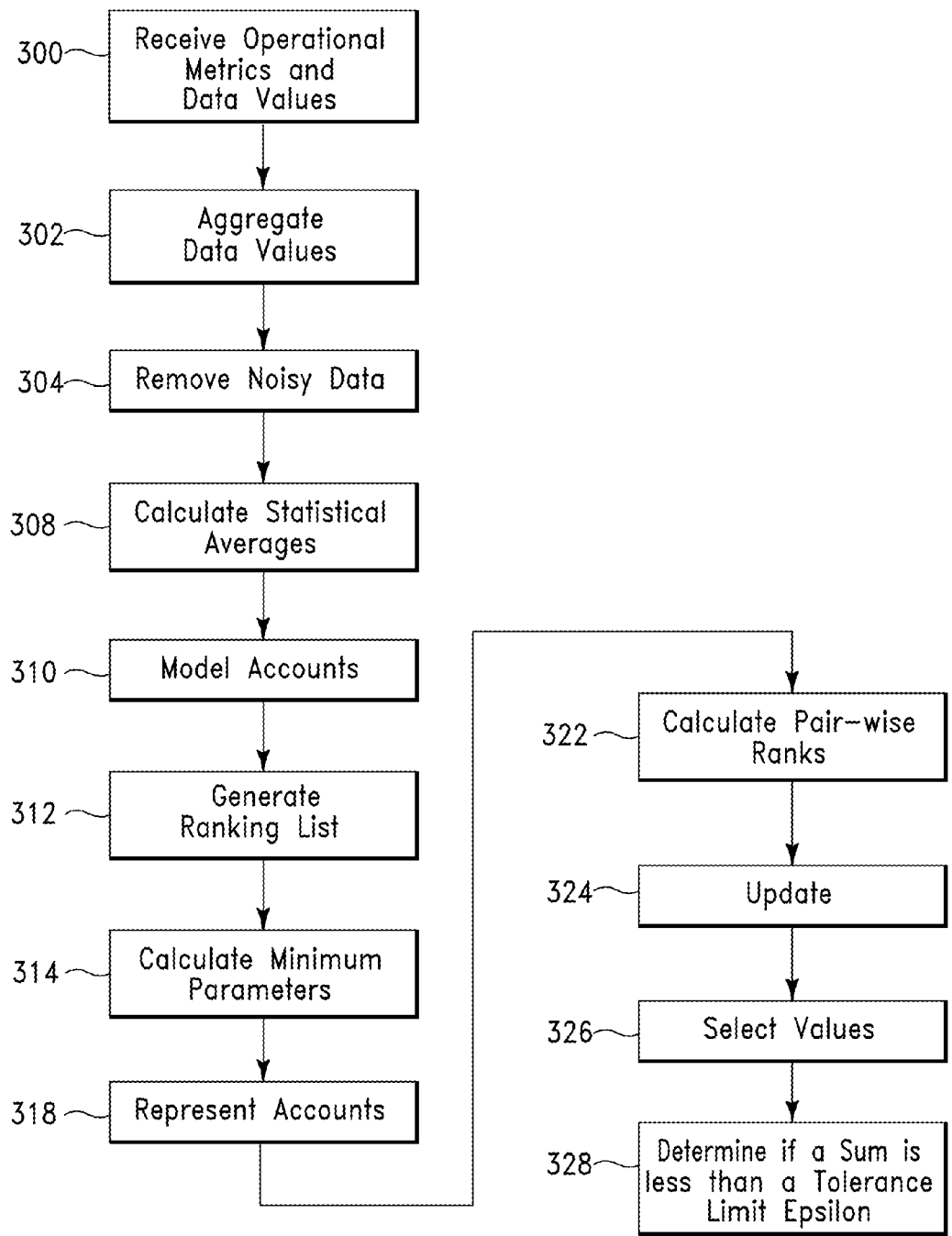
FIG. 3 illustrates an algorithm detailing a step of the algorithm of FIG. 2, in accordance with embodiments of the present invention.

FIG. 3 illustrates an algorithm detailing step 202 of the algorithm of FIG. 2, in accordance with embodiments of the present invention. In step 300, operational metrics and data values associated with the operational metrics (from accounts) are received by a computer processor of a computing system. In step 302, the data values are aggregated. In step 304, noisy data (e.g., corrupt data, unstructured data, unreadable data, etc) is removed from the operational metrics. In step 308, statistical averages associated with a performance of the accounts during a specified time period are calculated. In step 310, the computer processor models each account as a collection of operational performance variables and key performance indicators (KPI). An account (i)={Op1 ... OpN}, where Op is an operational parameter space comprising Op1 ... OpN. In step 312, a ranking list (R) comprising a ranking of accounts within the operational parameter space (Op) is generated using a pair-wise similarity measure. In step 314, a minimum number of independent operational parameters necessary (D) for representing a group of accounts in a reduced operational space $\{P\}$ of dimension D are calculated. In step 318, the accounts are represented as points in the reduced operational space $\{P\}$. In step 322, pair wise ranks $\{r\}$ of the group of accounts within the reduced operational space $\{P\}$ are calculated. In step 324, $x\_i \rightarrow x\_i + a^* \sum\_{i,j}(R\_{ij} - r\_{ij})(x\_i - x\_j)/|x\_i - x\_j|$ is updated. $x\_i$ comprises a position of account (i) within the reduced operational space $\{P\}$ and (a) comprises a relaxation parameter. In step 326, values associated with a tolerance limit epsilon are selected. In step 328, it is determined if a $\sum\_{i,j}(R\_{ij} - r\_{ij})^2$ is less than the tolerance limit epsilon. If in step 328 it is determined that the $\sum\_{i,j}(R\_{ij} - r\_{ij})^2$ is less than the tolerance limit epsilon then updated coordinates within the group of accounts within the reduced operational space $\{P\}$ are presented to a user.

Figure 4:
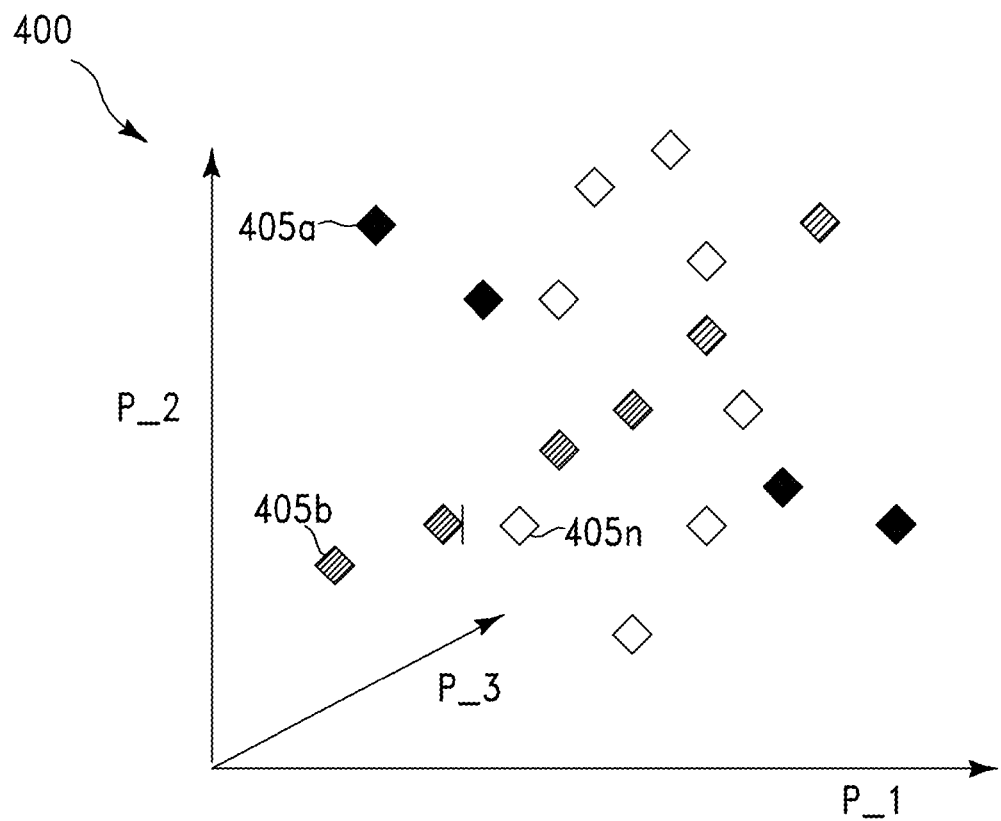
FIG. 4 illustrates a graph describing an example of a reduced operational space for an account, in accordance with embodiments of the present invention.

FIG. 4 illustrates a graph 400 describing an example of a reduced operational space P for an account A1, in accordance with embodiments of the present invention. Graph 400 comprises principle axes P_1, P_2, and P_3 along the reduced operational parameter space P. Each of points 405a. 405n comprises a representation of an operational state of the account A1 in a given month, measured over a time window of 18 months. Each point is assigned a color indicating overall customer satisfaction scores (e.g., green, amber, and red for good, mildly unsatisfactory, and bad). Each of the red points 405a, green points 405b, and amber points 405n lie on mutual orthogonal trajectories in the reduced operational space P, thereby predict customer satisfaction parameters based on trajectories in the reduced operational space P. If an account shows patterns of falling into an amber category, it may be prioritized for operational performance improvements to prevent a slip into a red category. The trajectories may be mathematically analyzed in the feature space.

Figure 5:
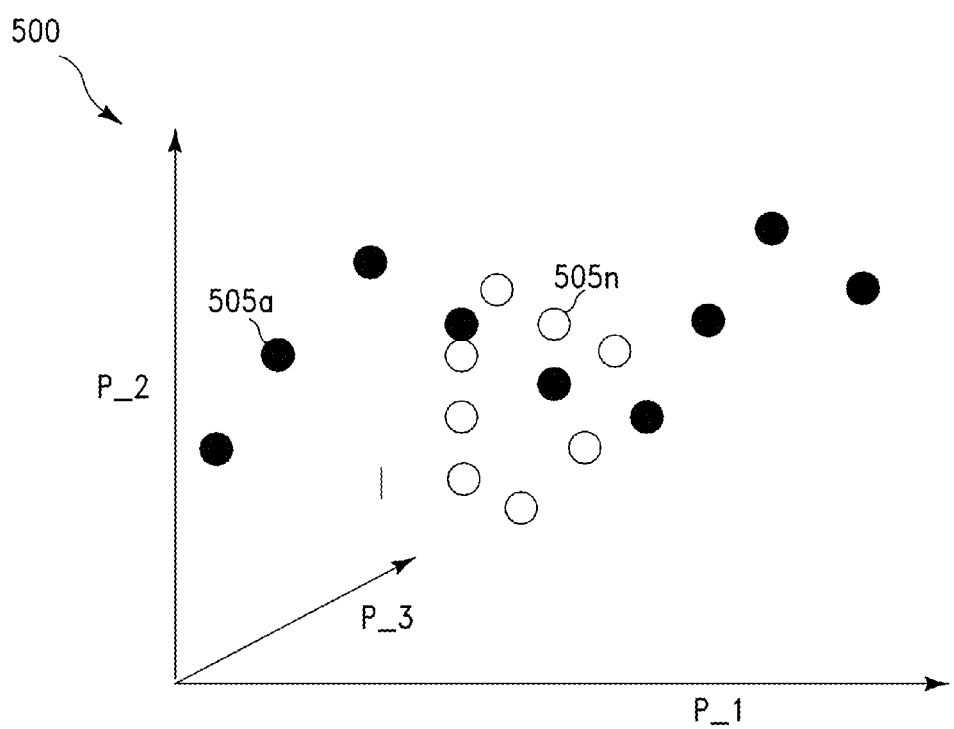
FIG. 5 illustrates a graph describing an example for comparing two accounts comprising similar contract value and sectors, in accordance with embodiments of the present invention.

FIG. 5 illustrates a graph 500 describing an example for comparing two accounts A2 and A3 comprising similar contract value and sectors, in accordance with embodiments of the present invention. Graph 500 comprises principle axes P_1, P_2, and P_3 along the reduced operational parameter space P. Account A2 (comprising blue circles 505a) and account A3 (comprising gray circles 505n) illustrate a large variability in ticket load across months. Account A2 remains in the reduced operational parameter space P, continuously adapting its operational performance to the change in ticket volumes, attrition, etc. Account A3 is localized in one portion of the operational phase space thereby indicating that account A3 is unable to respond to a changing demand. Account A3 may be prioritized for examining ticket load constitution, attrition, etc. The trajectory of account A2 projects a mathematical description of what a customer considers to be responsive and therefore comprises a mathematical representation of business agility. Confidence levels for which trajectory an account lies on may be additionally calculated.

Figure 6:
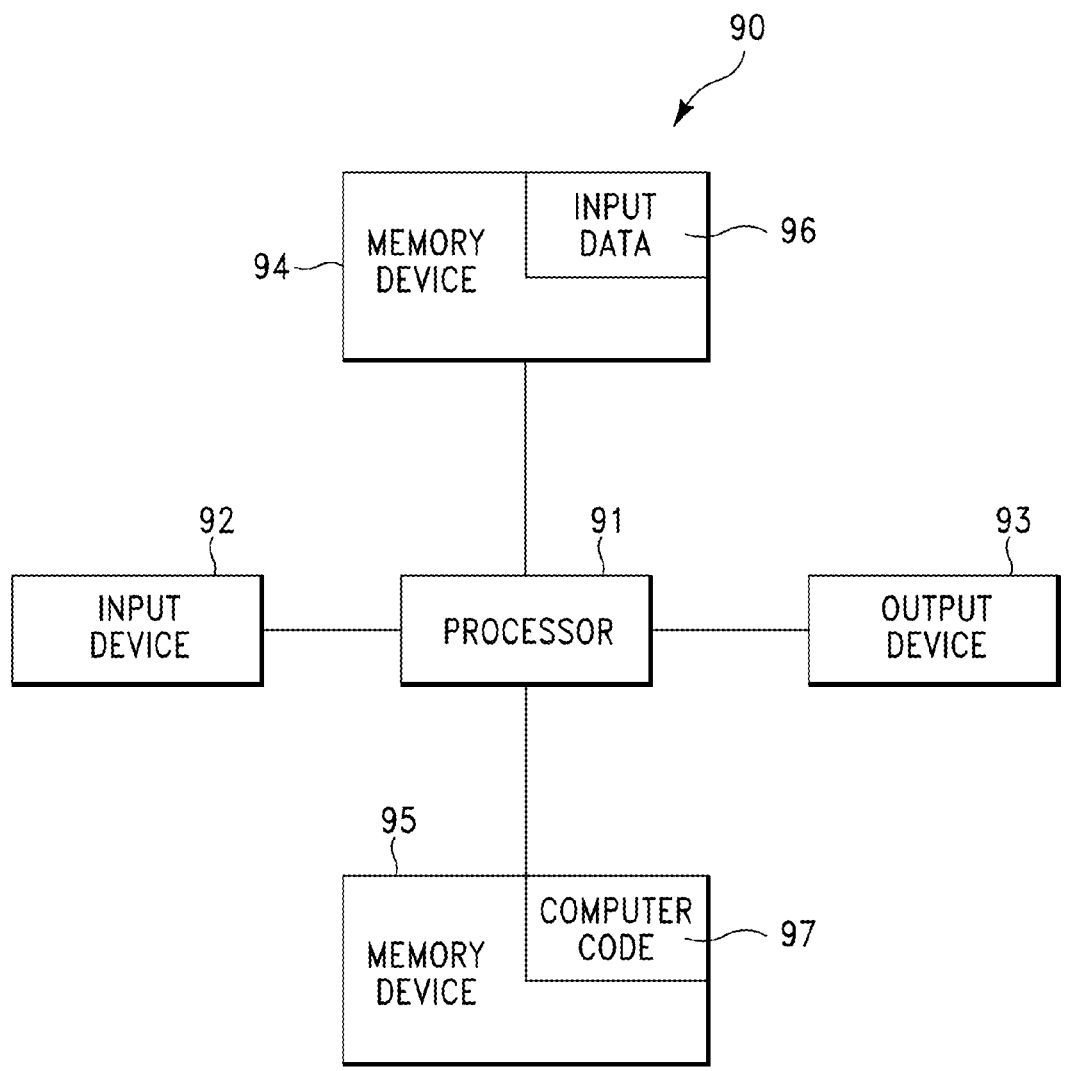
FIG. 6 illustrates a computer apparatus used by the system of FIG. 1 for managing a portfolio of accounts, in accordance with embodiments of the present invention.

FIG. 6 illustrates a computer apparatus 90 used by system 2 of FIG. 1 for managing a portfolio of accounts, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2 and 3) for managing a portfolio of accounts. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may comprise the algorithms of FIGS. 2 and 3 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service supplier who offers to manage a portfolio of accounts. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for managing a portfolio of accounts. In another embodiment, the invention provides a business method that performs the process steps of the invention on a subscription, advertising, and/or fee basis. That is, a service supplier, such as a Solution Integrator, could offer to manage a portfolio of accounts. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer program product, comprising a computer readable hardware storage device storing a computer readable program code, said computer readable program code comprising an algorithm that when executed by a computer processor of a computing system implements a method, said method comprising:

receiving, by a computer processor of a computing system from a plurality of service centers servicing accounts, operational metrics and data values associated with said operational metrics;

aggregating, by said computer processor, said data values;

removing, by said computer processor, noisy data from said operational metrics, said noisy data consisting of corrupt data, unstructured data, and unreadable data;

calculating, by said computer processor, statistical averages associated with a performance of said accounts during a specified time period;

modeling, by said computer processor, each account of said accounts as a collection of operational performance variables and key performance indicators (KPI), wherein an account (i)={OP1 ... OpN}, and wherein Op is an operational parameter space comprising operational parameters (Op1 ... OpN) from a number (1) to a number (N);

generating, by said computer processor, a ranking list (R) comprising a ranking of said accounts within said operational parameter space (Op) using a pair-wise similarity measure;

calculating, by said computer processor, a minimum number of independent operational parameters necessary (D) for representing a group of accounts of said accounts in a reduced operational space {P} of dimension D;

representing, by said computer processor, said accounts as points in said reduced operational space {P};

calculating, by said computer processor, pairwise ranks {r} of said group of accounts within said reduced operational space {P};

updating, by said computer processor, $x\_i \rightarrow x\_i + a*\sum_{i,j}(R\_ij - r\_ij)(x\_i - x\_j)/|x\_i - x\_j|$, wherein x_i comprises a position of account (i) within said reduced operational space {P}, wherein x_j comprises a position of account (j) within said reduced operational parameters space {P}, and wherein (a) comprises a relaxation parameter;

selecting, by said computer processor, values associated with a tolerance limit epsilon;

determining, by said computer processor, if $\sum_{i,j}(R\_ij - r\_ij)^2$ is less than said tolerance limit epsilon then presenting, by said computer processor, updated coordinates within said group of accounts within said reduced operation space {P}, otherwise, if $\sum\{i,j\}(R\_ij - r\_ij)^2$ is greater than said tolerance limit epsilon, repeating said calculating pairwise ranks and said updating until said $\sum\{i,j\}(R\_ij - r\_ij)^2$ is less than said tolerance limit epsilon;

plotting, by said computer processor, a trajectory for each account of said group of accounts within said reduced operational space {P}, wherein each said trajectory is associated with a specified time period associated with a specified time resolution, and wherein each said trajectory corresponds to a specific type of customer satisfaction rating;

calculating, by said computer processor, aggregates for overall account health of each said account of said group of accounts, wherein said calculating said aggregates is based on annual customer surveys and account manager ratings associated with an overall customer satisfaction corresponding to an account at regular time intervals; and mining, by said computer processor, each said trajectory for scores corresponding to financial health and business health based on benchmarking against project management reports in place of said annual customer surveys.

2. The computer program product of claim 1, wherein said method further comprises:

classifying, by said computer processor, said overall account health of each said account into multiple buckets, wherein each bucket of said multiple buckets is associated with a different color, wherein each said different color is associated with a different customer satisfaction rating.

3. The computer program product of claim 2, wherein said method further comprises:

assigning, by said computer processor based on said overall customer satisfaction, each point of each said trajectory an associated color of said different colors.

4. The computer program product of claim 3, wherein said method further comprises:

associating, by said computer processor, each said trajectory with a specified customer satisfaction rating of said overall customer satisfaction.

5. The computer program product of claim 4, wherein said method further comprises:

generating, by said computer processor, a mathematical equation within said reduced operational space $\{P\}$ for specified accounts of said accounts associated with a business agility.

6. The computer program product of claim 5, wherein said method further comprises:

querying, by said computer processor, portions of operational performance trajectories associated with multiple time resolution;

querying, by said computer processor, operational performance trajectories corresponding to a specified type of customer satisfaction rating;

identifying, by said computer processor, multiple types of customer satisfaction ratings; and generating, by said computer processor, scores associated with a financial health and a business health.

7. The computer program product of claim 1, wherein said method further comprises:

determining, by said computer processor, that there are D independent operational parameters necessary (D).

8. A computer system comprising a computer processor coupled to a computer-readable memory unit, said memory unit comprising instructions that when executed by the computer processor of a computing system implements a method comprising:

receiving, by a computer processor of a computing system from a plurality of service centers servicing accounts, operational metrics and data values associated with said operational metrics;

aggregating, by said computer processor, said data values;

removing, by said computer processor, noisy data from said operational metrics, said noisy data consisting of corrupt data, unstructured data, and unreadable data;

calculating, by said computer processor, statistical averages associated with a performance of said accounts during a specified time period;

modeling, by said computer processor, each account of said accounts as a collection of operational performance variables and key performance indicators (KPI), wherein an account (i)=$\{Op1 \ldots OpN\}$, and wherein Op is an operational parameter space comprising operational parameters $\{Op1 \ldots OpN\}$ from a number (1) to a number (N);

generating, by said computer processor, a ranking list (R) comprising a ranking of said accounts within said operational parameter space (Op) using a pair-wise similarity measure;

calculating, by said computer processor, a minimum number of independent operational parameters necessary (D) for representing a group of accounts of said accounts in a reduced operational space $\{P\}$ of dimension D;

representing, by said computer processor, said accounts as points in said reduced operational space $\{P\}$;

calculating, by said computer processor, pairwise ranks $\{r\}$ of said group of accounts within said reduced operational space $\{P\}$;

updating, by said computer processor, $x\_i \rightarrow x\_i + a*\backslash sum\_\{i,j\}(R\_ij-r\_ij)(x\_i-x\_j)/|x\_i-x\_j|$, wherein $x\_i$ comprises a position of account (i) within said reduced operational space $\{P\}$, wherein $x\_j$ comprises a position of account (j) within said reduced operational parameters space $\{P\}$, and wherein (a) comprises a relaxation parameter;

selecting, by said computer processor, values associated with a tolerance limit epsilon;

determining, by said computer processor, if $sum\_\{i,j\}(R\_ij-r\_ij)^2$ is less than said tolerance limit epsilon then presenting, by said computer processor, updated coordinates within said group of accounts within said reduced operation space $\{P\}$, otherwise, if $sum \{i,j\}(R\_ij-r\_ij)^2$ is greater than said tolerance limit epsilon, repeating said calculating pairwise ranks and said updating until said $sum \{i,j\}(R\_ij-r\_ij)^2$ is less than said tolerance limit epsilon;

plotting, by said computer processor, a trajectory for each account of said group of accounts within said reduced operational space $\{P\}$, wherein each said trajectory is associated with a specified time period associated with a specified time resolution, and wherein each said trajectory corresponds to a specific type of customer satisfaction rating;

calculating, by said computer processor, aggregates for overall account health of each said account of said group of accounts, wherein said calculating said aggregates is based on annual customer surveys and account manager ratings associated with an overall customer satisfaction corresponding to an account at regular time intervals; and mining, by said computer processor, each said trajectory for scores corresponding to financial health and business health based on benchmarking against project management reports in place of said annual customer surveys.

9. The computer system of claim 8, further comprising:

classifying, by said computer processor, said overall account health of each said account into multiple buckets, wherein each bucket of said multiple buckets is associated with a different color, wherein each said different color is associated with a different customer satisfaction rating.

10. The computer system of claim 9, further comprising:

assigning, by said computer processor based on said overall customer satisfaction, each point of each said trajectory an associated color of said different colors.

11. The computer system of claim 10, further comprising:

associating, by said computer processor, each said trajectory with a specified customer satisfaction rating of said overall customer satisfaction.

12. The computer system of claim 11, further comprising:

generating, by said computer processor, a mathematical equation within said reduced operational space $\{P\}$ for specified accounts of said accounts associated with a business agility.

13. The computer system of claim 12, further comprising:

querying, by said computer processor, portions of operational performance trajectories associated with multiple time resolution;

querying, by said computer processor, operational performance trajectories corresponding to a specified type of customer satisfaction rating;

identifying, by said computer processor, multiple types of customer satisfaction ratings; and generating, by said computer processor, scores associated with a financial health and a business health.

14. The computer system of claim 8, further comprising:

determining, by said computer processor, that there are D independent operational parameters necessary (D).

* * * * *